Patented Aug. 24, 1943

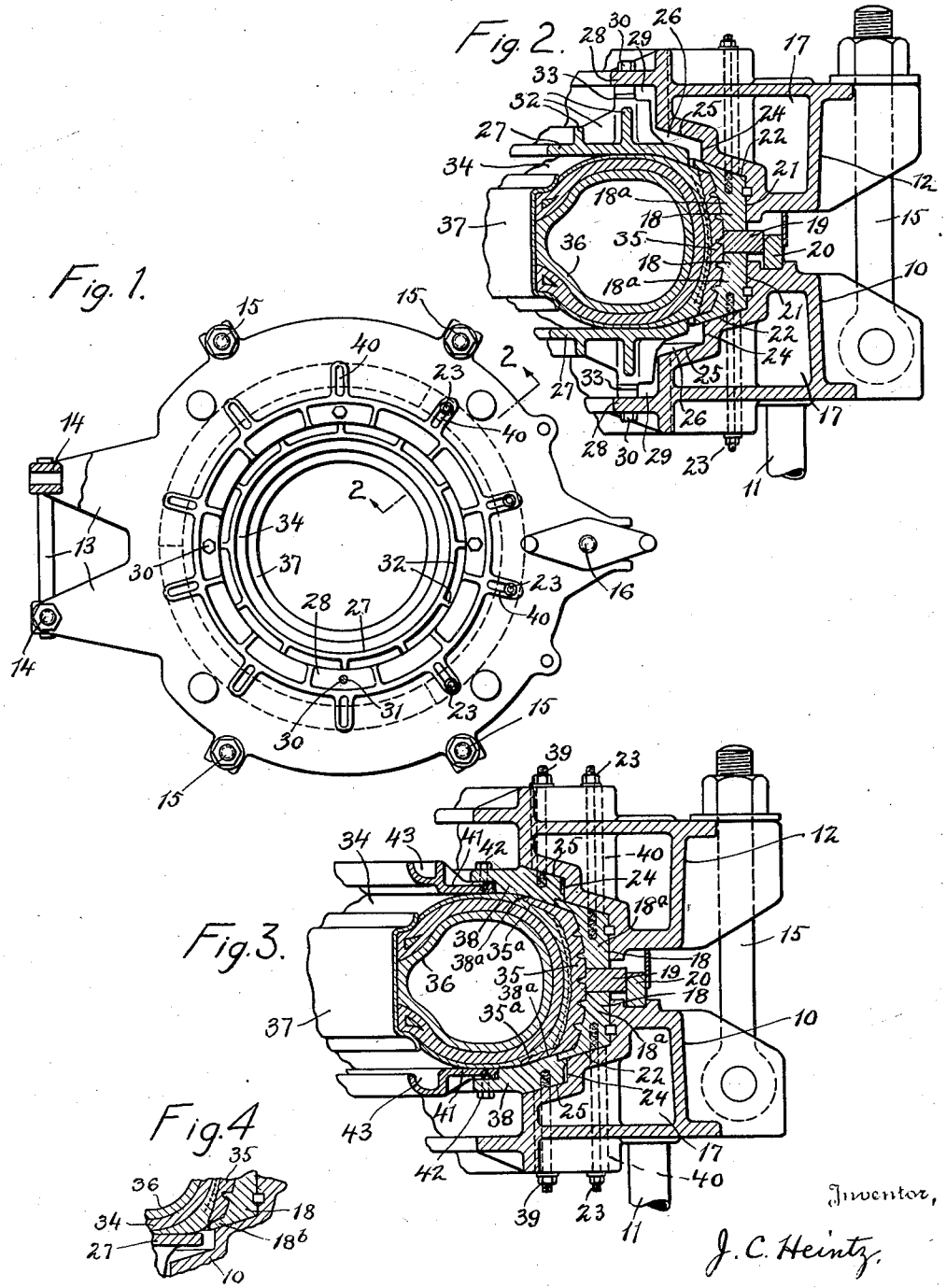

2,327,639

UNITED STATES PATENT OFFICE 2,327,639

CONVERTIBLE TIRE VULCANIZER

James C. Heintz, Lakewood, Ohio

Application January 22, 1940, Serial No. 314,928

11 Claims. (Cl. 18—18)

This invention relates to pneumatic-tire vulcanizers, and more particularly those of the hinged or watch-case type employed for retreading, although not wholly confined thereto.

The principal object in view is to provide an improved, compact apparatus adaptable to a wide range of tire sizes, for performing either shallow-flank recapping with relatively-cold side pressure rings, or deep-flank recapping or full retreading with vulcanizing side molding surfaces. A further object is to provide improved tread-matrix and side-ring mountings for recapping, full retreading and new-tire treading vulcanizers. This application is a continuation, in part, of my prior application for Art of retreading tires, Serial No. 311,151, filed December 27, 1939, now Patent No. 2,228,212, as to mold features common to the two disclosures.

Of the accompanying drawing views,

Fig. 1 is a plan view, partly broken away and in section, showing a horizontal hinged vulcanizer embodying my invention, fitted with "cold" side rings, in operation on a tire.

Fig. 2 is a partial vertical section on a larger scale, on the line 2—2 of Fig. 1.

Fig. 3 is a view corresponding to Fig. 2, showing the vulcanizer fitted with hot side rings, the cold rings being removed.

Fig. 4 is a detail sectional view showing a modified matrix.

Referring at first to Figs. 1 and 2, 10 is a lower mold or vulcanizer section adapted to be horizontally supported on a floor by legs 11. 12 is a complemental upper section connected at the back with the lower section by the usual hinge 13 having vertically adjustable bolts 14 for variably spacing the sections to accommodate different widths of tires. Each complete section comprises an integral cast-iron body and accessories including matrix members, etc., their fastenings, and clamping devices. The sections are adapted to be fastened together upon the work by the usual pivoted side clamping bolts 15 and a special pivoted clamping and mold-breaking bolt 16 at the front, as disclosed in my prior Patents 2,174,188 and 2,174,189 of September 26, 1939, and application Serial No. 258,216, filed February 24, 1939, now Patent No. 2,255,163.

Each mold section 10 or 12 is formed with a steam jacket 17 for heating the tread matrices, and the side-wall matrices when present. 18, 18 are the usual interchangeable, segmental, main tread-molding matrix rings formed with side flanges to define the retread flanks, said rings preferably being made of aluminum alloy, and 19 is one of the usual interchangeable spacer rings of selected thickness, employed between the main rings when necessary to obtain a desired tread width, the spacer being radially backed by an outer endless locking ring 20 carried on the lower mold section. The matrix rings and spacer in this case define a molding cavity for forming a full-width, shallow-flank recap.

Each main matrix ring 18 is peripherally formed with a radial-seating surface, preferably cylindrical and complemental to a fixed cylindrical matrix seat 21 formed on the inner wall of the steam jacket 17, which partly embraces said seat. The jacket wall is further formed, adjacent to and radially inward of the seat 21, with a fixed conical tread-matrix seat 22, engaged by a complemental conical seating face on the matrix ring 18, the cone angle being preferably of the order of 15 to 20 degrees to the central plane, as in my aforesaid Patent 2,174,189, but here the radial width of the seat 22 is slightly less than the radially shallowest one of the interchangeable matrix rings 18 employed in the mold, to accommodate the cold and hot side pressure rings hereinafter mentioned. The segments of the matrix rings 18 may, for example, be three or four in number and those in the rear are inserted and removed by a radial edgewise movement and retained by key tongues and grooves, while the locking segment 18a at the front, through which the Fig. 2 section is taken, is insertible and removable by an axial movement between the adjacent front ends of the two rear matrix segments, and detachably retained by vertical screw bolts 23. This matrix mounting is broadly described in said Patent 2,174,189 and the segment retaining devices further disclosed and claimed in my aforesaid application Serial No. 258,216, now Patent No. 2,255,163. Other matrix retaining devices could be employed.

Radially inward of the conical matrix seat 22, each mold section is formed with a seat 24 defining the inner limit of said seat 22, and an adjoining seat 25, these two defining a recess 26 and being shown respectively as cylindrical, and conical with the same angle as the seat 22, to obtain the best heat transmission, although such shape is not broadly essential. The seats 24, 25 are for mounting hot rings hereinafter described in connection with Fig. 3, and the recess 26 alternatively receives the peripheral lip of a recapping side pressure plate or ring 27. The seats 24 and 25 are laterally embraced or overlapped by the radial inward portion of the steam jacket 17.

Ring 27 is detachably mounted on an inner radial flange 28 of the mold section, laterally spaced from the inner edge of the seat 25 to define a mounting recess 29, and fastened by cap screws 30 whose stems pass through holes 31 in the flange, the hole rim constituting a fastener member on the flange. The back of the ring 27 is formed with stiffening and heat-radiating flanges 32, both edges are exposed to the air, and its mountings on the flange 28 are of relatively small area, so that the ring remains relatively cold, below a vulcanizing temperature, during the retread cure. Hence it is termed a "cold" ring whose temperature is anything short of that which would vulcanize new rubber or melt or overheat old rubber, to distinguish from a hot ring or cavity wall maintained at a vulcanizing temperature. The inner tire-confining surface of ring 27 is mostly flat, but that of the outer rim or lip, accommodated in the recess 26, may be slightly curved or coned inwardly toward the opposite ring 27 to better confine the tire shoulder flank. Each ring-attaching post may have a spacing washer 33 in its joint with the flange 28, but such spacers are usually not required when the mold cavity including said ring is properly related to the size of the tire under treatment. The tire 34 with retreading rubber 35 thereon is shown in the mold in Figs. 2 and 3, containing the usual air bag 36 and mounted on a suitable curing rim 37.

With the alternative side pressure-ring equipment illustrated in Fig. 3, the recapping cold rings 27 of Figs. 1 and 2 have been removed and in their place, in each mold section 10 or 12, is mounted a hot vulcanizing side matrix or pressure ring 38 whose outer seating faces closely conform to the seats 24, 25, and whose inner surface forms a radial inward continuation of the tread matrix seat 22, closely confining the tire side wall substantially at the middle and around the shoulder flank, for vulcanizing a radially-deep recap rubber wing 35ª, or vulcanizing side-wall rubber down to about the middle of the tire side in a full retread where the old rubber tread has been stripped from the carcass. The outer marginal portion 38ª of the tire-confining face of ring 38 is substantially conical, with an angle of the order of fifteen degrees like that of the tread-matrix side and its seat, conforming substantially to the average tire shoulder-flank angle, so as to support the shoulder flank with minimum distortion.

Vertical bolts 39, which are carried through radial slots 40 in the mold section 10 or 12, detachably fasten each hot ring 38 upon its mold section. In the outer ends of the four forward ones of said slots are also received the stems of the bolts 23 for fastening the axially inserted segment 18ª of the main matrix ring 18. The inner rim of each hot ring carries a non-vulcanizing or relatively cold side pressure ring 41 of the general character covered in my prior Patent No. 1,810,963 of June 23, 1931, fastened to the hot ring by cap screws 42, and having a narrow insulating spacing from the hot ring throughout most of their common area, said cold ring also being formed with a trough 43 for receiving cooling water when required.

In the modification of Fig. 4, the side flange 18ᵇ of each matrix ring 18 is inwardly offset laterally from the plane of the tire-side shoulder flank, to define the edge of a conventional shallow-flank recap narrower than the original tread.

In operating this apparatus for shallow-flank recapping, the mold is set up as in Figs. 1 and 2, with the proper cavity diameter and width of tread matrix 18, etc., to accommodate the particular tire without harmful distortion, and with cold side pressure rings 27 of the proper spacing mounted on the flanges 28 to accommodate the tire with but a slight flattening or distortion of its sides. The rim-mounted and slightly inflated tire 34 with top-cap vulcanizable rubber 35 applied to the roughened and cemented old tread rubber is then placed in the lower mold section 10, the upper section 12 is closed and clamped upon the lower section and the contained work, the tire is inflated to full curing pressure and the vulcanization proceeded with in the usual manner, followed by removal of the recapped tire. Accommodation of the pressure rings 27 in the recesses 26, in a mold which is adjustable for substantial variations of tire width, provides a large width capacity without extreme tire-wall distortion.

For a deep-flank recap over the carcass and remains of the old tread and side-wall rubber as indicated in Fig. 3, or for a full retread preceded by stripping off of the old tread and side-wall rubber down to about the middle of the tire sides, the cold rings 27 of Figs. 1 and 2 are removed and in their places are mounted the hot rings 38 carrying inner marginal cooling rings 41. The radially-outward margins of said rings 38 then overlap the radially-inward margins of the tread matrix rings 18, which are inset into their molding faces as shown, to form substantially continuous shoulder-flank and outer side-wall molding and vulcanizing surfaces. The apparatus of Fig. 3 could be employed, if desired, with suitable alteration omitting the cooling rings 41 and substituting inner side wall and bead vulcanizing hot molding surfaces of familiar character, for vulcanizing new tires, or the apparatus could be used as shown in Fig. 3, for vulcanizing the tread and outer side-wall rubber upon a previously vulcanized new carcass including inner side-wall rubber, in a two-stage process.

To those skilled in the art, it will be evident from the foregoing that this invention provides a superior convertible vulcanizer for recapping pneumatic tires, or for treading or retreading new or used tires. The form of the described embodiments could be considerably varied without departing from the scope of the invention as defined in the claims.

I claim:

1. A pneumatic-tire treading vulcanizer which comprises two annular sections each of which comprises a tread-molding matrix, a side-molding matrix and a heating jacket embracing the same, on the heating jacket seats for the tread-molding matrix and adjacent thereto and radially inward thereof seats for the side-molding matrix, the seats for the tread-molding matrix comprising a substantially cylindrical surface and adjoining it a substantially conical surface at an angle of the order of 15 to 20 degrees to the central plane dividing the sections.

2. A pneumatic-tire retreading vulcanizer which comprises two laterally adjustable annular sections, each of which sections comprises a side-molding matrix, a tread-molding matrix and a steam jacket embracing the same, and adjoining seats separately recessed in the jacket for the side-molding matrix and the tread-molding matrix, the seat for the tread-molding matrix comprising a substantially cylindrical surface and a substantially conical surface at an angle of the order of 15 to 20 degrees to the central plane dividing said sections.

3. A vulcanizer according to claim 2 having a tire-side confining cold pressure ring radially inwardly of the side molding matrix and secured thereto.

4. A pneumatic-tire retreading vulcanizer which comprises two laterally adjustable annular sections, each of which sections comprises a steam jacket, a tread-molding matrix and a side-molding matrix with inner surface adapted to contact the tread and sides of a tire, seats for the matrices separately recessed into the steam jacket, seating surfaces on the matrices complemental to said seats, the seat for the tread-molding matrix comprising a substantially cylindrical surface and a substantially conical surface at an angle of the order of 15 to 20 degrees to the central plane dividing said sections, and extending inwardly beyond the seating surface of the tread-molding matrix a seating surface on the side-molding matrix for an extension of the tread-molding matrix with an inner surface complemental to a portion of the inner surface of the side-molding matrix.

5. A pneumatic-tire vulcanizer which comprises two laterally adjustable annular sections, each of which sections comprises a tread-molding matrix and a side-molding matrix and a steam jacket embracing the same, seats for said matrices separately recessed into the jacket, complemental seating surfaces on the matrices, the seat for each matrix comprising a substantially cylindrical portion and a substantially conical portion at an angle of the order of 15 to 20 degrees to the central plane dividing said sections.

6. A pneumatic-tire vulcanizer which comprises two laterally adjustable annular sections, each of which sections comprises, a tread-molding matrix and a side-molding matrix and a steam jacket embracing the same, and on the steam jacket a radially cylindrical seat for the side-molding matrix and laterally adjacent and radially outward thereof a substantially conical seat for the tread matrix at an angle of the order of 15 to 20 degrees to the central plane dividing said sections.

7. A pneumatic-tire retreading vulcanizer which comprises two laterally adjustable annular sections each of which sections comprises a tread-molding matrix, a side-molding matrix and heating means therefor, seats on the heating means and complemental seats on the matrices, a substantially cylindrical seat on the heating means for the side-molding matrix and adjoining the same a substantially conical seat for the tread-molding matrix at an angle of the order of 15 to 20 degrees to the central plane dividing the sections.

8. In a pneumatic-tire retreading vulcanizer a tread-molding matrix and adjoining the same a side-molding matrix, complemental surfaces on the matrices where they join, and adjacent said complemental surfaces on the tread-molding matrix a substantially conical seating surface adapted to contact heating means, the molding surface of said side-molding matrix adjacent said complemental surfaces being substantially parallel to said conical seating surface.

9. A pneumatic-tire vulcanizer which comprises two annular sections, each of which sections comprises a steam jacket and a side-molding matrix seated thereon, said matrix being adapted to be heated by the jacket through a substantially conical seat and an adjoining substantially cylindrical seat on the jacket and through complemental adjoining seating surfaces of the matrix.

10. A pneumatic-tire treading vulcanizer which comprises two separable annular sections, each of which sections comprises two matrices and a steam jacket with seats thereon complemental to seating surfaces of the matrices and with the matrices seated thereon, one of the matrices being a tread matrix adapted to vulcanize a portion of the tread of the tire and the other matrix being a side-molding matrix adapted to vulcanize at least a portion of the side wall of the tire, the seating surfaces of the tread matrix comprising a substantially cylindrical seating surface and an adjoining substantially conical seating surface, and the seating surfaces of the side-molding matrix comprising a substantially cylindrical seating surface and an adjoining substantially conical seating surface, the conical seating surface of the tread matrix and the substantially cylindrical seating surface of the side-molding matrix meeting in a line substantially nearer the tire than the line of union of the seating surfaces of each individual matrix whereby the area of each matrix heated by contact with the steam jacket through said seating surfaces is large with respect to the volume of the respective matrices.

11. A pneumatic-tire vulcanizer which comprises two laterally adjustable annular sections, each section comprising a steam jacket, a side-molding matrix seated thereon and a tread-molding matrix seated on the jacket, the entire inner surface of the side-molding matrix adjacent the tread-molding matrix being cut away to form a seat for a flange on the tread-molding matrix, said tread-molding matrix being provided with an inwardly projecting flange seated thereon so as to form a molding surface for a portion of the side of a tire in addition to forming a molding surface for a portion of the tread of the tire so that by using the same side-molding matrices tires of different sizes may be vulcanized by lateral adjustment of the annular sections and the use of appropriate tread matrices.

JAMES C. HEINTZ.